US008672407B2

(12) United States Patent
Leconte et al.

(10) Patent No.: US 8,672,407 B2
(45) Date of Patent: Mar. 18, 2014

(54) HINGE MECHANISM AND VEHICLE SEAT COMPRISING SUCH A MECHANISM

(75) Inventors: Sébastien Leconte, Flers (FR); Cédric Legras, La Lande Patry (FR)

(73) Assignee: Faurecia Sièges d'Automobile, Nanterre (FR)

( * ) Notice: Subject to any disclaimer, the term of this patent is extended or adjusted under 35 U.S.C. 154(b) by 285 days.

(21) Appl. No.: 13/183,770

(22) Filed: Jul. 15, 2011

(65) Prior Publication Data

US 2012/0019041 A1  Jan. 26, 2012

(30) Foreign Application Priority Data

Jul. 20, 2010  (FR) ...................... 10 55918

(51) Int. Cl.
*B60N 2/20* (2006.01)
*B60N 2/22* (2006.01)
*B60N 2/225* (2006.01)

(52) U.S. Cl.
USPC ......................................................... 297/362

(58) Field of Classification Search
USPC ......................................................... 297/362
See application file for complete search history.

(56) References Cited

U.S. PATENT DOCUMENTS

| 5,634,689 | A  | * | 6/1997 | Putsch et al. | 297/362 |
|---|---|---|---|---|---|
| 6,918,635 | B2 | * | 7/2005 | Finner et al. | 297/362 |
| 7,086,699 | B1 | * | 8/2006 | Addison et al. | 297/362 X |
| 7,090,299 | B2 | * | 8/2006 | Lange | 297/362 |
| 7,188,903 | B2 | * | 3/2007 | Finner et al. | 297/362 |
| 7,264,566 | B2 | * | 9/2007 | Dill et al. | 297/362 X |
| 7,281,765 | B2 | * | 10/2007 | Scholz et al. | 297/362 |
| 7,484,806 | B2 | * | 2/2009 | Ito et al. | 297/362 |
| 7,607,737 | B2 | * | 10/2009 | Liebich et al. | 297/362 |
| 8,424,970 | B2 | * | 4/2013 | Ito | 297/362 |
| 2005/0179297 | A1 | * | 8/2005 | Finner et al. | 297/362 |
| 2006/0290187 | A1 | * | 12/2006 | Scholz et al. | 297/362 |
| 2007/0138853 | A1 | * | 6/2007 | Ito et al. | 297/362 |
| 2008/0136241 | A1 | * | 6/2008 | Stemmer et al. | 297/362 |
| 2008/0217980 | A1 | * | 9/2008 | Zou et al. | 297/362 |
| 2009/0102265 | A1 | * | 4/2009 | Eppert et al. | 297/362 |
| 2010/0013287 | A1 | * | 1/2010 | Mitsuhashi | 297/362 |
| 2010/0013288 | A1 | * | 1/2010 | Mitsuhashi | 297/362 |
| 2010/0201174 | A1 | * | 8/2010 | Ito | 297/362 |
| 2010/0244530 | A1 | * | 9/2010 | Kitano et al. | 297/362 |
| 2011/0140493 | A1 | * | 6/2011 | Krueger et al. | 297/362 |
| 2011/0140494 | A1 | * | 6/2011 | Krueger et al. | 297/362 |
| 2011/0304188 | A1 | * | 12/2011 | Aktas | 297/362 |
| 2012/0001471 | A1 | * | 1/2012 | Wei | 297/362 |

FOREIGN PATENT DOCUMENTS

DE  10021404 A1  11/2001
DE  102008028102 A1  12/2009

OTHER PUBLICATIONS

French Search Report from corresponding French Patent Application No. FR 1055918 Report Dated May 5, 2011.

* cited by examiner

*Primary Examiner* — Rodney B White

(74) *Attorney, Agent, or Firm* — Miller, Matthias & Hull LLP

(57) ABSTRACT hinge mechanism comprising first and second rotating frames and a control member mounted rotatably in a neck of the first frame, such control member being capable of controlling the relative rotation of the frames. A metal retaining part is held in the neck by pressing, and the control member is mounted rotatably independently of the retaining part and abuts against such retaining part.

10 Claims, 5 Drawing Sheets

HINGE MECHANISM AND VEHICLE SEAT COMPRISING SUCH A MECHANISM

CROSS-REFERENCE TO RELATED APPLICATIONS

This application claims priority under the Paris Convention to the French Patent Application No. 10 55918, filed on Jul. 20, 2010,

FIELD OF THE DISCLOSURE

The present invention relates to hinge mechanisms and vehicle seats comprising such mechanisms.

BACKGROUND OF THE DISCLOSURE

More particularly, the invention relates to a hinge mechanism comprising:
   first and second metal frames mounted rotatably relative to each other, the first frame comprising a cylindrical neck of circular section,
   a control member mounted rotatably in the neck of the first frame, said control member being capable of controlling the relative rotation of the first and second frames,
   a metal retaining part, capable of retaining the control member at least in a first direction parallel to the first axis.

Document DE-A-10 2008 028 102 describes an example of a hinge mechanism of this type, in which the control member passes through the second frame and has an external part that protrudes out of the second frame opposite the first frame, this external part comprising a radial groove in which the retaining ring is elastically fitted.

This hinge mechanism has the following drawbacks:
   the control member is made longer, heavier and more complex due to the mounting of the retaining ring,
   the hinge mechanism is made more bulky in the axial direction due to the protruding external part of the control member,
   the metal retaining ring rests against the outer surface of the second metal frame, which can generate friction and noise during operation of the hinge mechanism, in such a way that in practice it is necessary to provide a sliding block between the retaining ring and said outer surface of the second frame, leading to additional cost.

A particular purpose of this invention is to overcome these drawbacks.

SUMMARY OF THE DISCLOSURE

To this end, a hinge mechanism of the type in question is characterised in that the retaining part is force-fitted into the neck of the first frame and is held in said neck by pressing against an inner surface of said neck.

The aforementioned drawbacks are thus avoided, and the retaining part is able to be held effectively against the inner surface of the neck by pressing, without it being necessary to make particular provisions for the inner surface of the neck, because both parts are made of metal.

In various embodiments of the hinge mechanism according to the invention, one or more of the following arrangements may also be used:
   the retaining part is a ring centered on the first axis;
   the control member is held (directly or indirectly) by the second frame in a second direction opposite to the first direction, the control member being mounted rotatably independently of said retaining part and abutting against said retaining part in the first direction;
   the retaining part comprises peripheral teeth protruding outwards and elastically pressing against the inner surface of the neck;
   said teeth extend slanting radially outwards relative to the first axis and in the first direction;
   the inner surface of the neck is cylindrical and smooth;
   the control member is made from plastic;
   the control member is completely contained in the first and second frames;
   the first and second frames are connected to each other by a gear, said hinge mechanism also comprising an eccentric cam mounted rotatably in the neck of the first frame, the control member being mounted rotatably about a second axis relative to the second frame and said control member being capable of driving the eccentric cam in rotation;
   the gear is hypocycloidal;
   the gear comprises first and second circular sets of teeth that mesh with each other and are mechanically connected to the first and second frames respectively, said first and second sets of teeth being centered respectively on said first and second axes.

Furthermore, another purpose of the invention is a vehicle seat comprising first and second parts connected to each other by a hinge mechanism as defined above, the bracket and the second frame being fixed, one to the first part and the other to the second part. The first and second seat parts can optionally be one a seat base and the other a backrest.

BRIEF DESCRIPTION OF THE DRAWINGS

Further characteristics and advantages of the invention will become apparent on reading the following description of an embodiment, given as a non-limitative example, in relation to the attached drawings.

On the drawings.

In the various figures, the same references denote identical or similar components.

DETAILED DESCRIPTION OF THE DISCLOSURE

Figure 1:
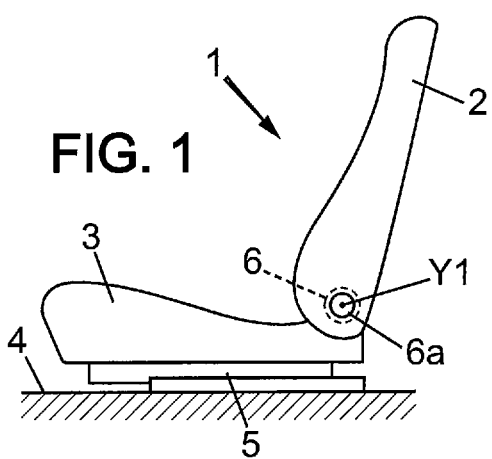
FIG. 1 is a diagrammatical view of a vehicle seat that can be equipped with a hinge mechanism according to the invention.
Figure 2:
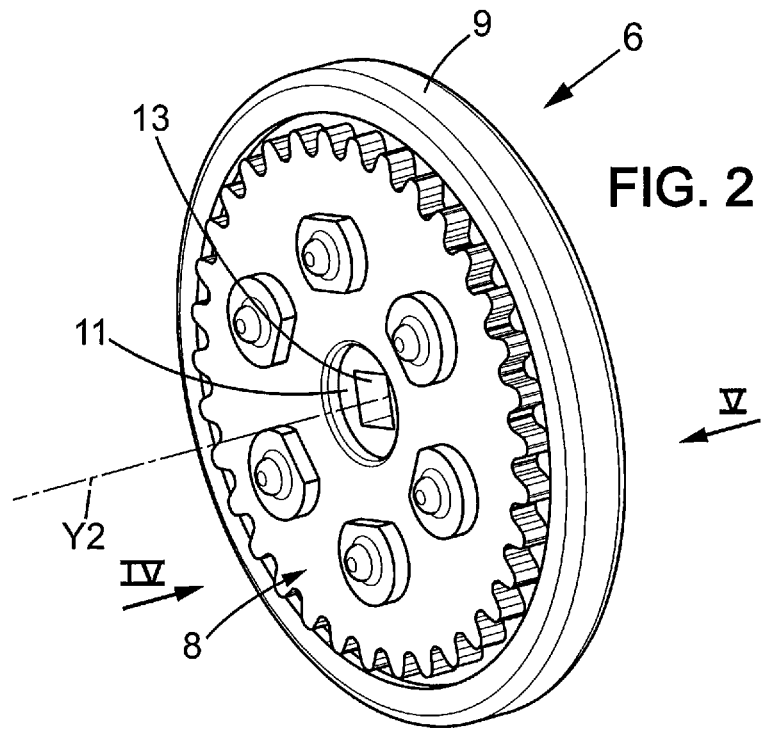
FIGS. 2 and 3 are perspective views, in two opposite directions respectively, of the hinge mechanism that can be fitted to the seat in FIG. 1, in an embodiment of the invention.
Figure 3:
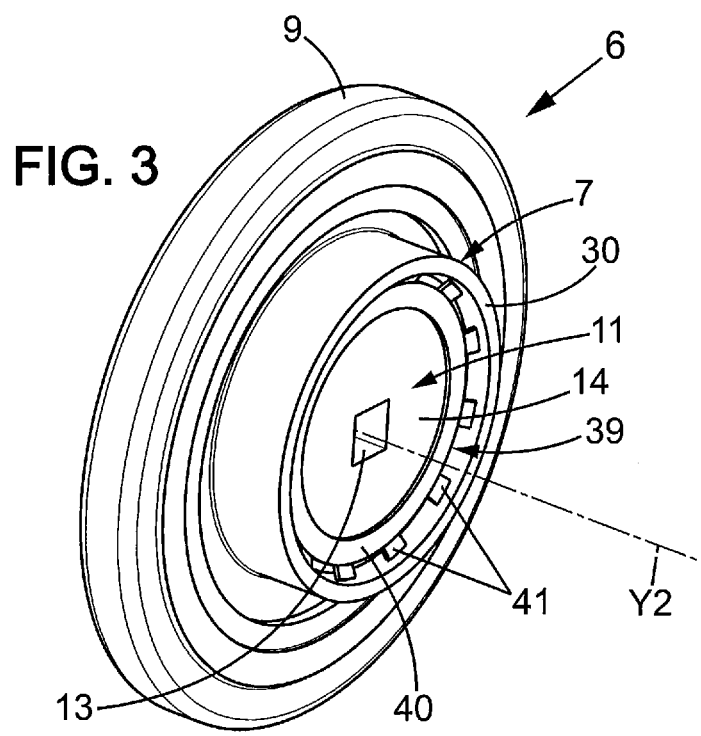
Figure 4:
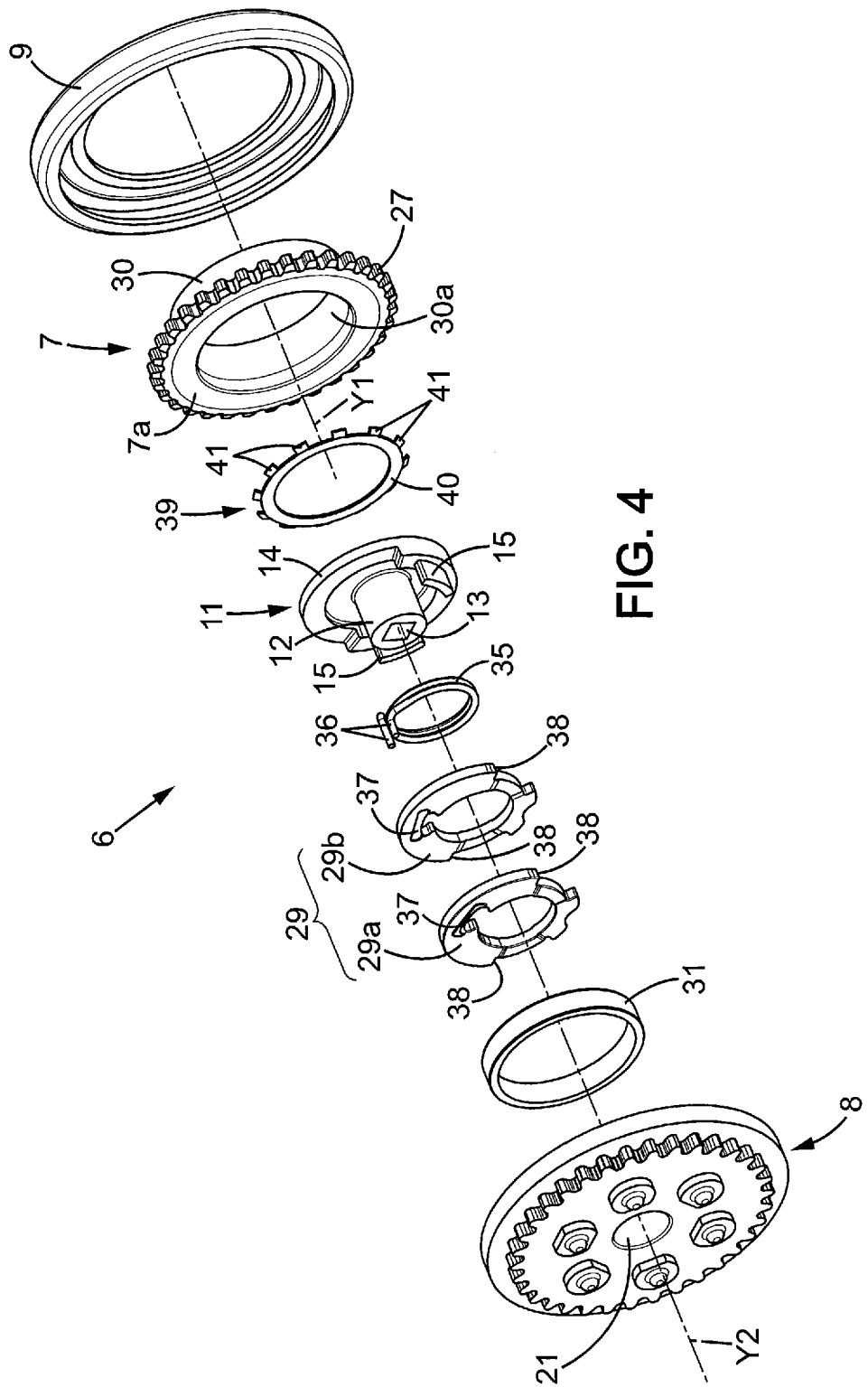
FIGS. 4 and 5 are exploded perspective views of the hinge mechanism in FIG. 2, seen respectively in the directions IV and V in FIG. 2.
Figure 5:
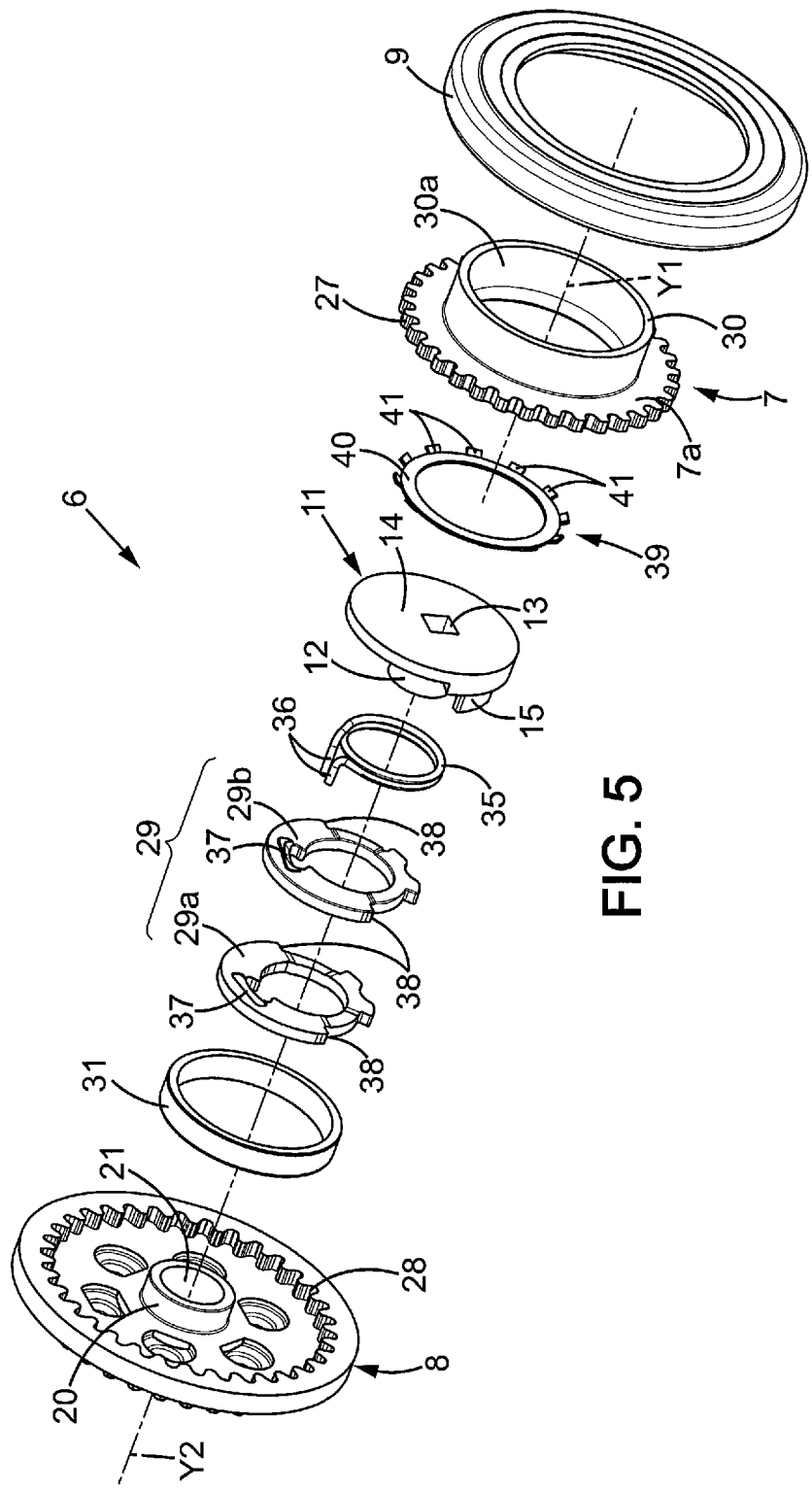
Figure 6:
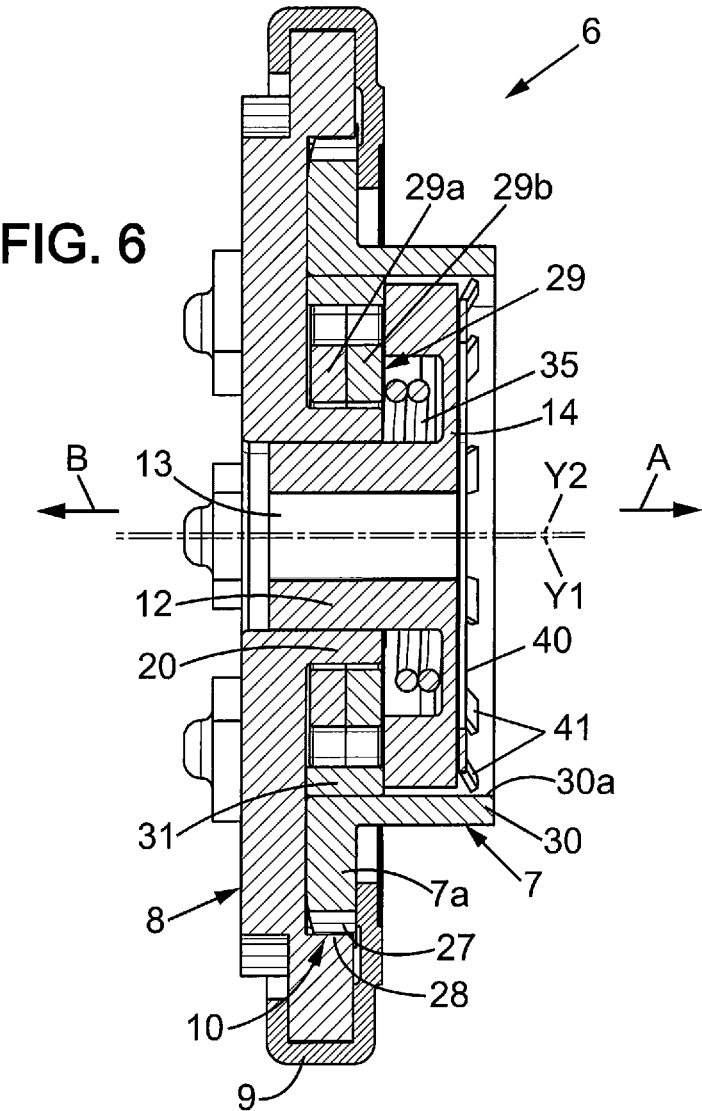
FIG. 6 is an axial cross-sectional view of the hinge mechanism in FIG. 2.

FIG. 1 shows a front seat 1 of a motor vehicle, comprising a backrest 2 mounted pivotably about an axis Y1 on a seat base 3, which seat base is itself mounted on the vehicle floor 4, for example by means of slide rails 5.

Thus, the inclination of the backrest 2 is manually adjustable by means of a rotating control knob 6a or similar that drives a geared hinge mechanism 6 (i.e. a mechanism that positively controls the rotation of the backrest), an embodiment of which is shown in FIGS. 2 to 6. In a variant, the drive of the mechanism 6 can be controlled by an electric or other motor.

This hinge mechanism 6 comprises (see FIGS. 2 to 6):

- a first frame 7 comprising a first disc-shaped metal flange 7a that extends in a plane perpendicular to the axis Y1 and which, in the example shown, can be for example integral with the frame of the seat base 3,
- a second frame 8 formed by a second disc-shaped metal flange that extends parallel to the first flange 7a, said second flange 8 being for example integral with the frame of the backrest 2 (in particular by welding or other means) and being held against the first flange by any known means, for example by means of a metal locking ring 9 crimped onto said second frame and surrounding the first frame 7 (in a variant, the locking ring 9 can be replaced by a flat ring welded onto the second frame 8 and surrounding the first frame 7),
- a hypocycloidal gear 10 connecting the first and second frames 7, 8 to each other (see FIG. 6),
- and an input element 11, also known as the control shaft, which controls the hypocycloidal gear 10.

The input element 11, which can be seen clearly in FIGS. 2 to 5, can for example be formed in a single piece by moulding of a plastic or light alloy. This input element 11 comprises a central shaft 12 that extends longitudinally along a central axis Y2 parallel to the aforementioned axis Y1 but offset relative to such axis Y1.

A square inner hole 13 (or splined, or other) can optionally be made in the central shaft 12, into which the aforementioned control knob 6a can fit.

Moreover, the central shaft 12 is extended radially outwards, at its end opposite the second flange 8, by a collar 14 that extends parallel to the flanges 7a, 8. The inner surface of the collar 14 is extended towards the hypocycloidal gear 10 by at least one stop component 15, in this case two stop components 15, which here are fingers extending parallel to the axis Y2 towards the second flange 8, the purpose of which will become apparent below.

The central shaft 12 has a cylindrical shape centered on the axis Y2 and rotates in a bearing integral with the second flange 8 and itself centered on the axis Y2. Here, this bearing is formed by a cylindrical through-hole 21 made in the second flange 8 and in a neck 20 that is integral with said second flange. The neck 20 can for example be formed in a single piece with the second flange 8 and extends axially from the second flange 8 towards the first flange 7.

Here, the hypocycloidal gear 10 is a single-train gear (but it could also be a hypocycloidal planetary gear) that comprises for example:

- a first circular set of teeth 27 centered on the axis Y1, such sets of teeth being oriented radially outwards and formed on the periphery of the flange 7a of the first frame,
- a second circular set of teeth 28 formed on the inner surface of the second frame 8 and oriented radially inwards, such second set of teeth being centered on the axis Y2, said second set of teeth 28 having an inner diameter greater than the outer diameter of the first set of teeth 27,
- and a rigid eccentric cam 29, for example made from metal, that extends perpendicular to the axis Y1 and is driven by the input element 11, such cam turning around the neck 20 in a cylindrical hole 30a of circular section integral with the first frame 7 and passing through the flange 7a, said hole 30a being centered on the axis Y1. The cylindrical hole 30a is formed in particular by the smooth cylindrical inner surface of a metal neck 30 integral with the flange 7a. A bracket (not shown) can optionally be welded around the neck 30, itself fixed to the frame of the seat base 3.

A ring 31 forming a bearing can if applicable be inserted radially between the eccentric cam 29 and the hole 30a, such ring being force-fitted into the hole 30a.

The input element 11 is rotatably connected to the eccentric cam 29. Thus, the rotation of the input element 11 about the second axis Y2 drives a rotation of the cam 29 about the second axis Y2, which causes the relative rotation of the first and second flanges 7, 8.

The cam 29 could be formed in one piece, but in the specific case under consideration here, it is made up (see FIGS. 4 to 6) of two superimposed disc-shaped metal half-cams 29a, 29b. The half-cams 29a, 29b can be moved rotatably relative to each other between a minimum eccentricity position and a maximum eccentricity position.

The half-cams 29a, 29b are elastically forced towards their maximum eccentricity position by a spring 35 that comprises two axial arms 36 simultaneously entering two cutouts 37 belonging respectively to the half-cams 29a, 29b. In the idle position of the hinge mechanism, the half-cams 29a, 29b are used to compensate for the internal play of the hypocycloidal gear 10.

The half-cams 29a, 29b could also be replaced by wedge-shaped half-cams, also known to a person skilled in the art.

Finally, the control member 11 is axially held in the first and second frames 7, 8:

- by abutment against a metal retaining part 39, in this case a retaining ring 39 capable of retaining the control member 11 in a first direction A parallel to the first axis Y1 (see FIG. 6),
- and in the second direction B opposite to the first direction, by direct or indirect abutment against the second frame 8: in the example under consideration here, the periphery of the collar 14 abuts against the ring 31 which itself abuts against the inner surface of the first frame 8 in the second direction B.

The retaining ring 39 is force-fitted into the neck 30 of the first frame and is held in said neck by pressing against the inner surface 30a of said neck, and in that the control member abuts against said retaining ring in the first direction. Advantageously, the retaining ring 39 comprises a radial ring 40 the periphery of which is cut into notches to form teeth 41 that are bent back so that they extend sloping radially outwards and axially in the first direction A. These peripheral teeth press elastically against the inner surface 30a of the neck, which effectively holds the retaining ring 39 in the first direction A due to the metal-to-metal contact between the teeth 41 and the neck 30, even when the inner surface 30a of the neck is cylindrical and smooth.

Furthermore, as the control member 11 is made from plastic, the contact between the collar 14 of the control member 11 and the ring 40 of the retaining ring generates only a small amount of friction and no noise, so that no sliding block is necessary.

Moreover, no component external to the first and second frames is necessary to ensure the axial retention of the control member and the internal components of the hinge mechanism 6, so that the control member can be completely contained in the first and second frames. The space occupied by the hinge mechanism in the axial direction is thus reduced, and the weight and complexity of the control member are reduced.

Finally, the hinge mechanism assembly process is particularly simple, as it is possible to simply stack the parts on top of each other, starting from the second frame 8, the retaining ring 39 being the last part positioned (before or after the locking ring 9 is crimped). This particularly simple assembly process also means that the assembly clearances are managed automatically.

The hinge mechanism that has just been described operates in a conventional manner: when a user operates the input element 11 by means of the aforementioned knob 6a, one of the stops 15 of the input element abuts angularly against corresponding rims 38 of the two half-cams 29a, 29b, in such a way that the cam 29 rotates in the hole 30a in the neck, driving the gear 10, so that the second frame 8 rotates with the backrest 2 relative to the first frame 7 and the seat base 3.

The invention claimed is:

1. A hinge mechanism comprising:
   first and second metal frames mounted rotatably relative to each other, the first frame comprising a cylindrical neck centered on a first axis,
   a control member mounted rotatably in the neck of the first frame, said control member being capable of controlling the relative rotation of the first and second frames,
   a metal retaining part, capable of retaining the control member parallel to the first axis, at least in a first direction wherein the retaining part is force-fitted into the neck of the first frame and is held in said neck by pressing against an inner surface of said neck.

2. The hinge mechanism according to claim 1, wherein the retaining part is a ring centered on the first axis.

3. The hinge mechanism according to claim 1, wherein the control member is held by the second frame in a second direction opposite to the first direction, the control member being mounted rotatably independently of said retaining part by abutting against said retaining part in the first direction.

4. The hinge mechanism according to claim 1, wherein the retaining part comprises peripheral teeth protruding outwards and pressing elastically against the inner surface of the neck, said teeth extending slanting radially outwards relative to the first axis and in the first direction.

5. The hinge mechanism according to claim 1, wherein the control member is made from plastic.

6. The hinge mechanism according to claim 1, wherein the control member is completely contained in the first and second frames.

7. The hinge mechanism according to claim 1, wherein the first and second frames are connected to each other by a gear, said hinge mechanism also comprising an eccentric cam mounted rotatably in the neck of the first frame, the control member being mounted rotatably about a second axis relative to the second frame and said control member being capable of driving the eccentric cam in rotation.

8. The hinge mechanism according to claim 7, wherein the gear is hypocycloidal and the gear comprises first and second circular sets of teeth that mesh with each other and are mechanically linked to the first and second frames respectively, said first and second sets of teeth being centered respectively on said first and second axes.

9. A vehicle seat comprising first and second parts connected to each other by the hinge mechanism according to claim 1, wherein the first and second frames of said hinge mechanism are fixed, one to the first part and the other to the second part.

10. The vehicle seat according to claim 9, in which said first and second parts are, one a seat base and the other a backrest.

* * * * *